United States Patent
Adithya et al.

(10) Patent No.: US 10,661,654 B2
(45) Date of Patent: May 26, 2020

(54) METHOD FOR SETTING DISPLAY OF VEHICLE INFOTAINMENT SYSTEM AND VEHICLE INFOTAINMENT SYSTEM TO WHICH THE METHOD IS APPLIED

(71) Applicants: Hyundai Motor Company, Seoul (KR); Kia Motors Corporation, Seoul (KR)

(72) Inventors: Nimmagadda Adithya, Telangana (IN); Bedudoori Bharath Kumar, Telangana (IN); Chimtam Pavan Kumar, Pradesh (IN); Vemula Sudheer Kumar, Andhra Pradesh (IN); Behara Vineet, Telangana (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 7 days.

(21) Appl. No.: 16/197,027

(22) Filed: Nov. 20, 2018

(65) Prior Publication Data

US 2020/0101842 A1 Apr. 2, 2020

(30) Foreign Application Priority Data

Sep. 27, 2018 (IN) .............................. 201811036563

(51) Int. Cl.
| | |
|---|---|
| *B60K 35/00* | (2006.01) |
| *G06T 7/90* | (2017.01) |
| *G06F 3/048* | (2013.01) |
| *G06F 21/00* | (2013.01) |
| *G09G 5/02* | (2006.01) |
| *H04B 17/318* | (2015.01) |

(52) U.S. Cl.
CPC ................ *B60K 35/00* (2013.01); *G06T 7/90* (2017.01); *H04B 17/318* (2015.01); *B60K 2370/188* (2019.05); *B60K 2370/55* (2019.05); *B60K 2370/589* (2019.05)

(58) Field of Classification Search
CPC combination set(s) only.
See application file for complete search history.

(56) References Cited

U.S. PATENT DOCUMENTS

| 9,578,668 B2 | 2/2017 | Sim | |
|---|---|---|---|
| 2014/0309806 A1* | 10/2014 | Ricci | ................... B60R 25/1004 701/1 |
| 2014/0309870 A1* | 10/2014 | Ricci | ....................... G01S 19/42 701/36 |

(Continued)

FOREIGN PATENT DOCUMENTS

| KR | 101479624 B1 | 1/2015 |
|---|---|---|
| KR | 2015-0074545 A | 7/2015 |

*Primary Examiner* — Wesner Sajous
(74) *Attorney, Agent, or Firm* — Mintz Levin Cohn Ferris Glovsky and Popeo, P.C.; Peter F. Corless (57) ABSTRACT

A method for controlling a display of a vehicle infotainment system may include: establishing, by a controller of the vehicle infotainment system, a wireless communication session with a first user device; receiving, by the controller, an indication of a representative color from the first user device via the established wireless communication session; and controlling, by the controller, the vehicle infotainment system such that a display screen of a display device of the vehicle infotainment system displays the representative color.

17 Claims, 12 Drawing Sheets

(56) References Cited

U.S. PATENT DOCUMENTS

2016/0057790 A1* 2/2016 Sim .................. H04W 76/14
                                                    455/41.1
2019/0191267 A1* 6/2019 Wang ................ H04W 76/14

* cited by examiner

METHOD FOR SETTING DISPLAY OF VEHICLE INFOTAINMENT SYSTEM AND VEHICLE INFOTAINMENT SYSTEM TO WHICH THE METHOD IS APPLIED

CROSS-REFERENCE TO RELATED APPLICATION

This Application claims under 35 U.S.C. § 119(a) the benefit of Indian Patent Application No. 201811036563 filed on Sep. 27, 2018. The entire contents of these applications are incorporated herein by reference in their entirety.

BACKGROUND OF THE DISCLOSURE (a) Technical Field

The present disclosure relates to a graphical user interface (GUI) for a vehicle, and more particularly, to a method for setting a display of a vehicle infotainment system and a vehicle infotainment system to which the method is applied.

(b) Description of the Related Art

An infotainment system is used to provide information to a user in a vehicle. The information provided to the user may be stored in the infotainment system (e.g., a motion picture on digital versatile disc (DVD)), may be received from another source (e.g., broadcasted radio or a television program), or may be created by the infotainment system (e.g., a portable navigation device). Such information may be based on any input data such as time, current location, or the like, and may be provided to the user in audio-form, visual-form, or a combination thereof.

Notably, there is a need to provide personalized content which is suitable for specific demands of a driver or a passenger. Personalized content may be particularly useful for a driver and/or passenger driving long distances, as an example.

Some vehicle infotainment systems implement an intelligent transport system (ITS) which may include a vehicle navigation system that provides surrounding road conditions, or the like, to the driver based on a current location of the vehicle using a global positioning system (GPS). For example, the vehicle navigation system may detect location information of the vehicle using GPS information received from a GPS satellite and provide map information corresponding to the location information using the detected location information.

The vehicle may also be installed with a vehicle multimedia device, such as an audio device, an audio and video (AV) device, a digital multimedia broadcasting (DMB) terminal, and the like, in addition to the navigation system as mentioned above, for convenience of the user. Images which are associated with various operations of the vehicle multimedia device may be displayed by a display device, and the display device may be generally installed in a center fascia (e.g., center console) of the vehicle between a driver seat and a passenger seat.

The above information disclosed in this Background section is only for enhancement of understanding of the background of the disclosure, and therefore, it may contain information that does not form the related art already known in this country to a person of ordinary skill in the art.

SUMMARY OF THE DISCLOSURE

The present disclosure has been made to provide a method for setting a display of a vehicle infotainment system and a vehicle infotainment system to which the method is applied which are capable of enhancing convenience of a vehicle user by controlling a color of the display of the vehicle infotainment system according to a color preference of the vehicle user set through a user device.

According to embodiments of the present disclosure, a method for setting a display of a vehicle infotainment system may include: establishing, by a controller of the vehicle infotainment system, a wireless communication session with a first user device; receiving, by the controller, an indication of a representative color from the first user device via the established wireless communication session; and controlling, by the controller, the vehicle infotainment system such that a display screen of a display device of the vehicle infotainment system displays the representative color.

The method may further include: storing, by the controller, the representative color in a media access control (MAC) address of the first user device.

The method may further include: controlling, by the controller, the vehicle infotainment system such that the display screen displays the representative color stored in the MAC address when the first user device reconnects to the vehicle infotainment system via wireless communication.

The method may further include: controlling, by the controller, the vehicle infotainment system such that the display screen displays a representative color of a second user device that is stored in a second MAC address when the second user device reconnects to the vehicle infotainment system via wireless communication.

The method may further include: before the display screen displays the representative color, controlling, by the controller, vehicle infotainment system such that the display screen displays a preview screen of the vehicle infotainment system to a user, wherein the preview screen shows the representative color as being applied to the vehicle infotainment system.

The method may further include: receiving, by the controller, a wireless communication signal from the first user device via the established wireless communication session; determining, by the controller, whether a received signal strength indication (RSSI) value of the wireless communication signal received from the first user device exceeds a reference value; and enlarging, by the controller, a display screen size of the display device when the RSSI value exceeds the reference value.

The method may further include: maintaining, by the controller, the display screen size of the display device when the RSSI value is less than or equal to the reference value.

The method may further include: capturing, by a camera of the first user device, an image of interest; extracting, by a controller of the first user device, a color from the captured image; and transmitting, by the controller of the first user device, the extracted color to the vehicle infotainment system via the established wireless communication session, wherein the extracted color corresponds to the representative color.

The extracting of the color may include: converting, by the controller of the first user device, the captured image to a three-dimensional RGB format having a sampling rate; dividing, by the controller of the first user device, the converted three-dimensional RGB format using grids to calculate an average value of pixel values in the grids; and determining, by the controller of the first user device, a color from a color palette that corresponds to the average value as the extracted color from the captured image.

Furthermore, according to embodiments of the present disclosure, a vehicle infotainment system may include: a display device; and a controller configured to establish a wireless communication session with a first user device, to receive an indication of a representative color from the first user device via the established wireless communication session, and to control the vehicle infotainment system such that a display screen of a display device of the vehicle infotainment system displays the representative color.

The controller may be configured to store the representative color in a media access control (MAC) address of the first user device.

The controller may be configured to control the vehicle infotainment system such that the display screen displays the representative color stored in the MAC address when the first user device reconnects to the vehicle infotainment system via wireless communication.

The controller may be configured to control the vehicle infotainment system such that the display screen displays a representative color of a second user device that is stored in a second MAC address when the second user device reconnects to the vehicle infotainment system via wireless communication.

Before the display screen displays the representative color, the controller may be configured to control the vehicle infotainment system such that the display screen displays a preview screen of the vehicle infotainment system to a user, wherein the preview screen shows the representative color as being applied to the vehicle infotainment system.

The controller may be configured to receive a wireless communication signal from the first user device via the established wireless communication session, to determine whether a received signal strength indication (RSSI) value of the wireless communication signal received from the first user device exceeds a reference value, and to enlarge a display screen size of the display device when the RSSI value exceeds the reference value.

The controller may be configured to maintain the display screen size of the display device when the RSSI value is less than or equal to the reference value.

The representative color may be extracted from an image of interest captured by a camera of the first user device.

The method for setting the display of the vehicle infotainment system and the vehicle infotainment system according to embodiments of the present disclosure may improve comfort of the vehicle user (e.g., a driver or a passenger of the vehicle) by setting the color of the display (or a display screen) of the vehicle infotainment system according to a color preference of the vehicle user set through a user device. The color of the display may be referred to as a color theme or a background color.

BRIEF DESCRIPTION OF THE DRAWINGS

A brief description of the drawings will be provided to more sufficiently understand the drawings which are used in the detailed description of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, the present disclosure will be described in detail by describing embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Figure 1:
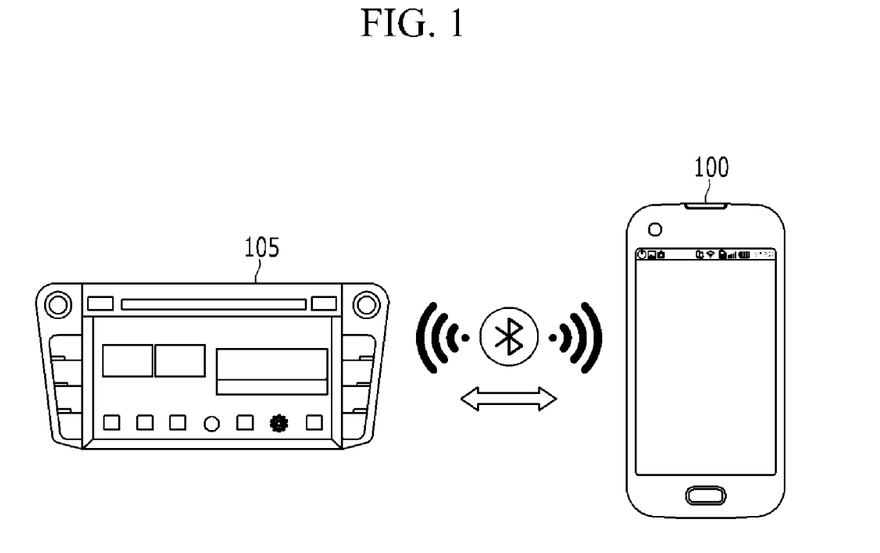
FIG. 1 is a view for explaining a vehicle infotainment system and a user device to which a method for setting a display of a vehicle infotainment system according to embodiments of the present disclosure is applied.
Figure 2:
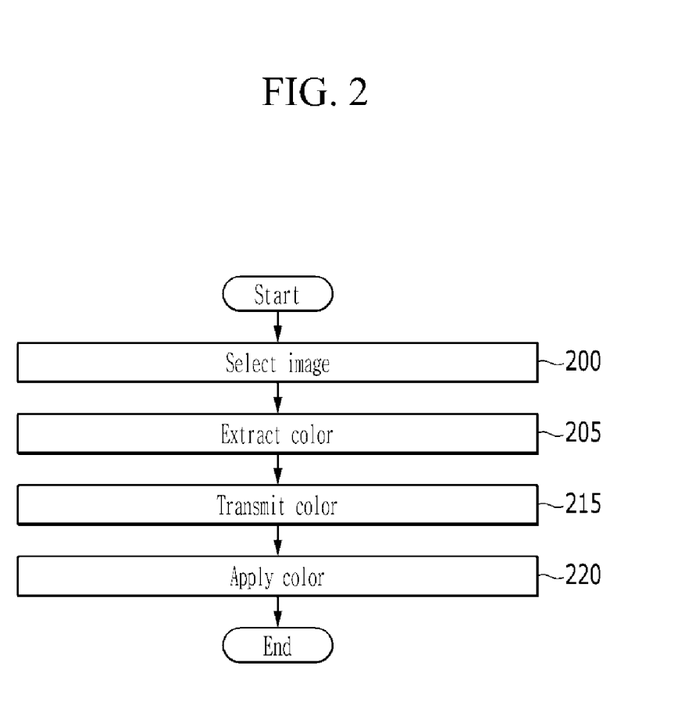
FIG. 2 is a flowchart illustrating the method for setting the display of the vehicle infotainment system according to embodiments of the present disclosure.
Figure 3:
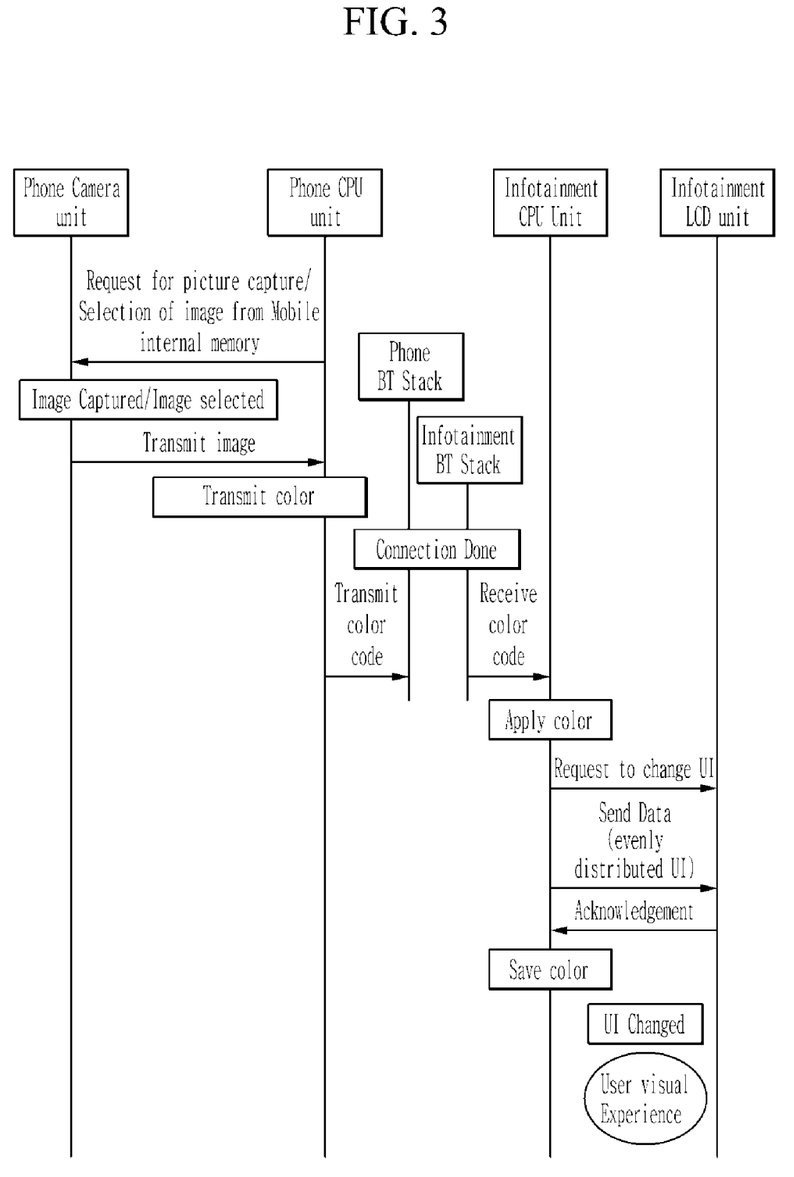
FIG. 3 is a view explaining the method for setting the display of the infotainment system for the vehicle shown in FIG. 2 in more detail.
Figure 4:
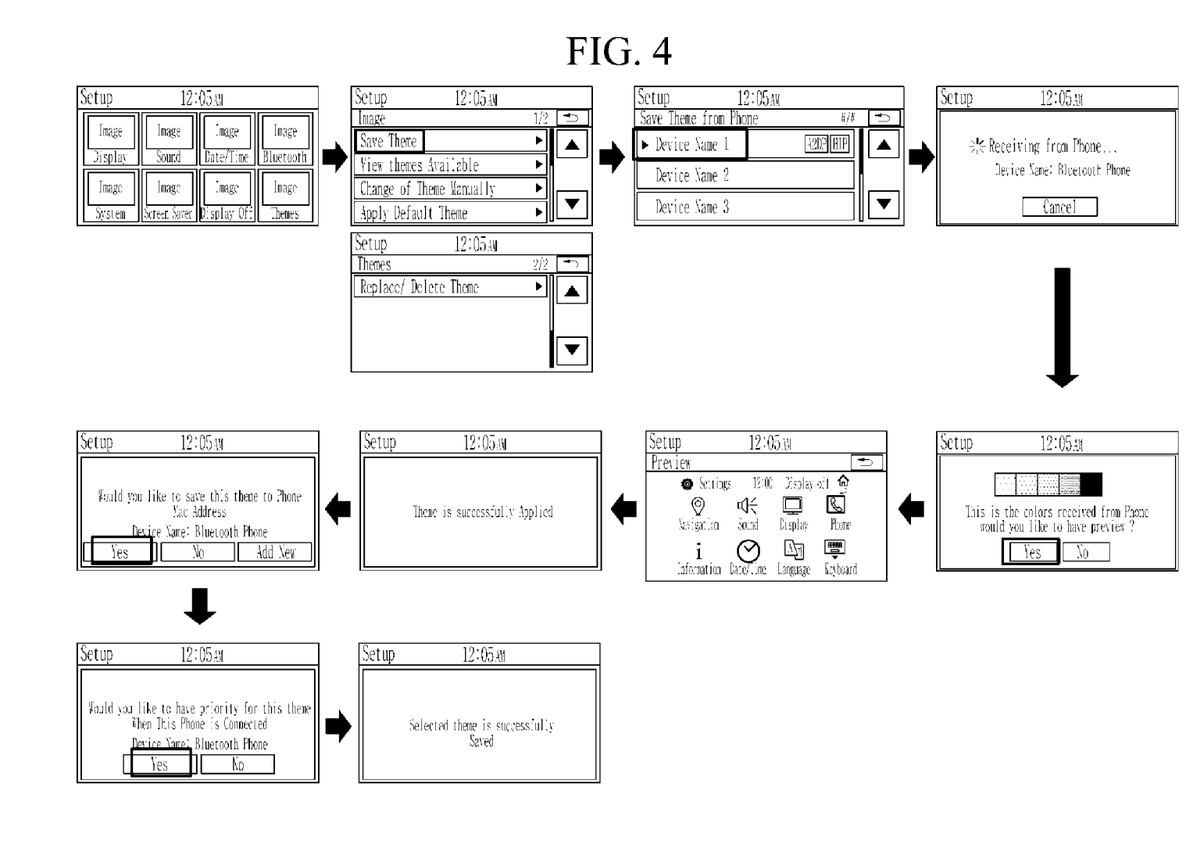
FIG. 4 is a view for explaining a color application step shown in FIG. 2.

Referring now to the presently disclosed embodiments, FIG. 1 is a view for explaining a vehicle infotainment system and a user device to which a method for setting a display of a vehicle infotainment system according to embodiments of the present disclosure is applied; FIG. 2 is a flowchart illustrating the method for setting the display of the vehicle infotainment system according to embodiments of the present disclosure; FIG. 3 is a view explaining the method for setting the display of the infotainment system for the vehicle shown in FIG. 2 in more detail; and FIG. 4 is a view for explaining a color application step shown in FIG. 2.

Referring to FIGS. 1 to 4, in selection step 200, a camera of the user device 100 (alternatively referred to herein as a "first user device") may capture or photograph an image (or a picture) in which a vehicle user having the user device is interested or may capture the image of interest to store the image in a memory of the user device. The captured image of interest may be selected in response to a request from a controller of the user device 100 and may be transmitted (or transferred) to a controller of the user device. For example, the user device 100 may be a mobile terminal such as a smart phone with an application, a tablet personal computer, a smart pad, or the like.

The controller of the user device 100, which is a central processing unit (CPU), may control operation of the user device. For example, as described above, the controller may be one or more microprocessors operated by a program or hardware including the microprocessor. The program may include a series of commands for executing the method for setting the display of the vehicle infotainment system according to the embodiments of the present disclosure. The commands may be stored in a memory of the user device 100.

According to extracting step 205, the controller of the user device 100 may extract (or select) a representative color (e.g., a prominent color or the user's preferred color) from the selected image using a color extraction program. For example, the color extraction program may represent (or convert) the selected image as a three-dimensional (3D) Red-Green-Blue (RGB) format having a predetermined sampling rate, may divide the converted 3D RGB format using grids to calculate an average value of pixel values in the grids, and may determine a color from a color palette that corresponds to the average value as the extracted color from the selected image. Additionally, or alternatively, the controller of the user device 100 may extract the representative color from the selected image using a known color extraction program.

According to transmission step 215, the controller of the user device 100 may transmit the selected representative color to the vehicle infotainment system 105 via a wireless communication session established between the vehicle infotainment system 105 and the user device 100 (e.g., near-field wireless communication such as Bluetooth communication), as shown in FIG. 1. The controller of the user device 100 may convert an RGB color code, which are a color code of the representative color, to a Hex HTML format and may transmit the converted format to the vehicle infotainment system 105. The controller of the user device 100 may transmit the representative color using Bluetooth stack which is software for supporting a serial port profile (SPP).

A controller of the vehicle infotainment system 105 may receive the transmitted representative color for setting a display screen of the infotainment system of the vehicle using the Bluetooth stack. The controller of the vehicle infotainment system 105 may convert the Hex HTML format of the received representative color to the RGB color code.

The infotainment system 105 for the vehicle may also be referred to as a head unit for a vehicle. The vehicle infotainment system (i.e., vehicle infotainment device), which is an incorporated system of core functionality information, such as drive, guide, and the like, and entertainment information and human friendly functions, may be a system in which navigation, audio and video, and Internet are coupled in the vehicle. More specifically, the vehicle infotainment system, may include devices or technologies providing searching of Internet, vehicle, movies, games, TVs, social network service (SNS), and the like, various services linked to navigation and a mobile device, and the like in the vehicle.

The controller of the vehicle infotainment system 105, which is a central processing unit (CPU), may control operation of the vehicle infotainment system. For example, as described above, the controller may be one or more microprocessors operated by a program or hardware including the microprocessor. The program may include a series of commands for executing the method for setting the display of the vehicle infotainment system according to embodiments of the present disclosure. The commands may be stored in a memory of the vehicle infotainment system 105.

According to step 220, the controller of the vehicle infotainment system 105 may control operation of the vehicle infotainment system 105 so as to apply the received representative color to an entire screen of a display device (e.g., a liquid crystal display (LCD)) of the infotainment system for the vehicle.

Referring again to FIG. 4, before the representative color is applied to the screen of the display device, the controller of the infotainment system 105 for the vehicle may control operation of the vehicle infotainment system 105 so as to provide a preview screen of the infotainment system, to which the representative color (or a color theme) is applied, to the user via the display device.

The controller of the vehicle infotainment system 105 may store the applied representative color in a media access control (MAC) address (or a first MAC address) of the user device that is stored in the controller of the infotainment system of the vehicle. When the user device 100 is reconnected to the vehicle infotainment system 105 via an established wireless communication session, the representative color may be preferentially applied to the screen of the display device. In other words, when the user device 100 is reconnected to the vehicle infotainment system 105 via wireless communication, the controller of the vehicle infotainment system 105 may apply the representative color stored in the MAC address to the screen of the display device.

Figure 5:
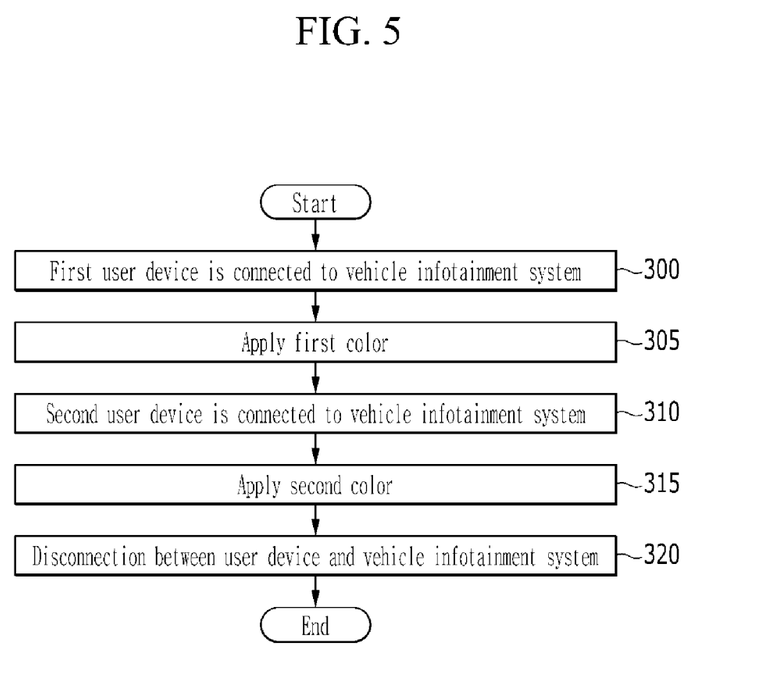
FIG. 5 is a flowchart illustrating a display change method included in the method for setting the display of the infotainment system shown in FIG. 2.
Figure 6:
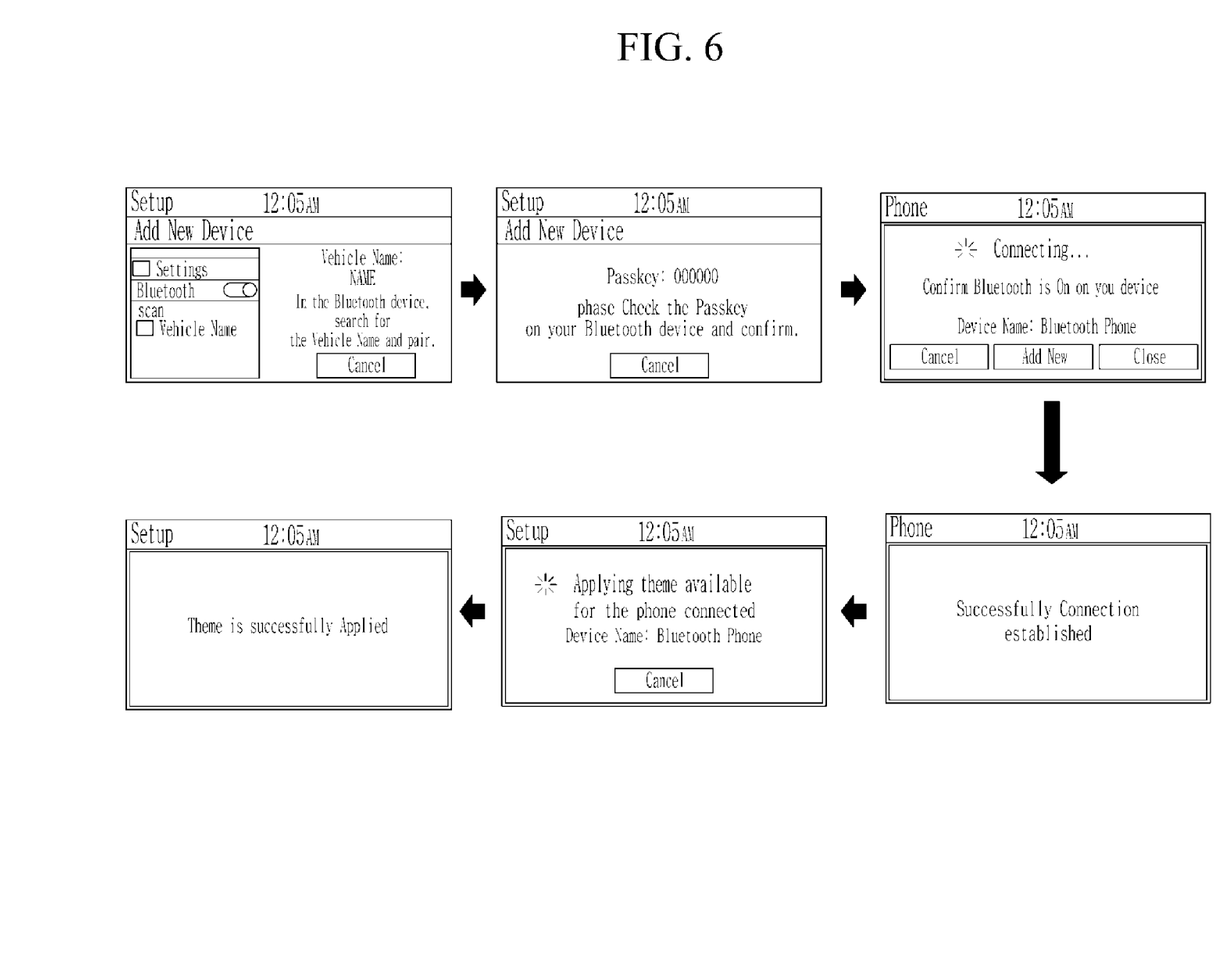
FIG. 6 is a view for explaining a color application step shown in FIG. 5.
Figure 7:
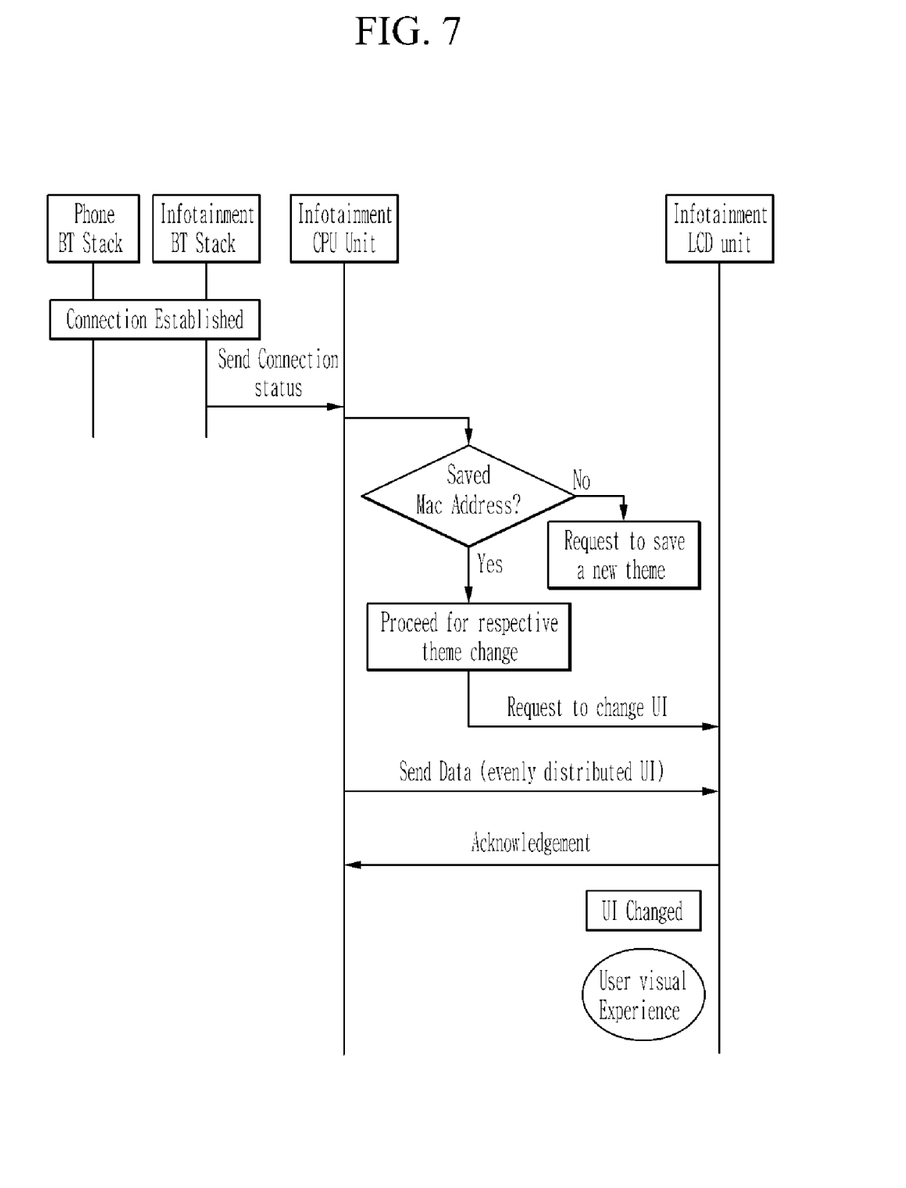
FIG. 7 is a view for explaining the display change method shown in FIG. 5 in more detail.
Figure 8:
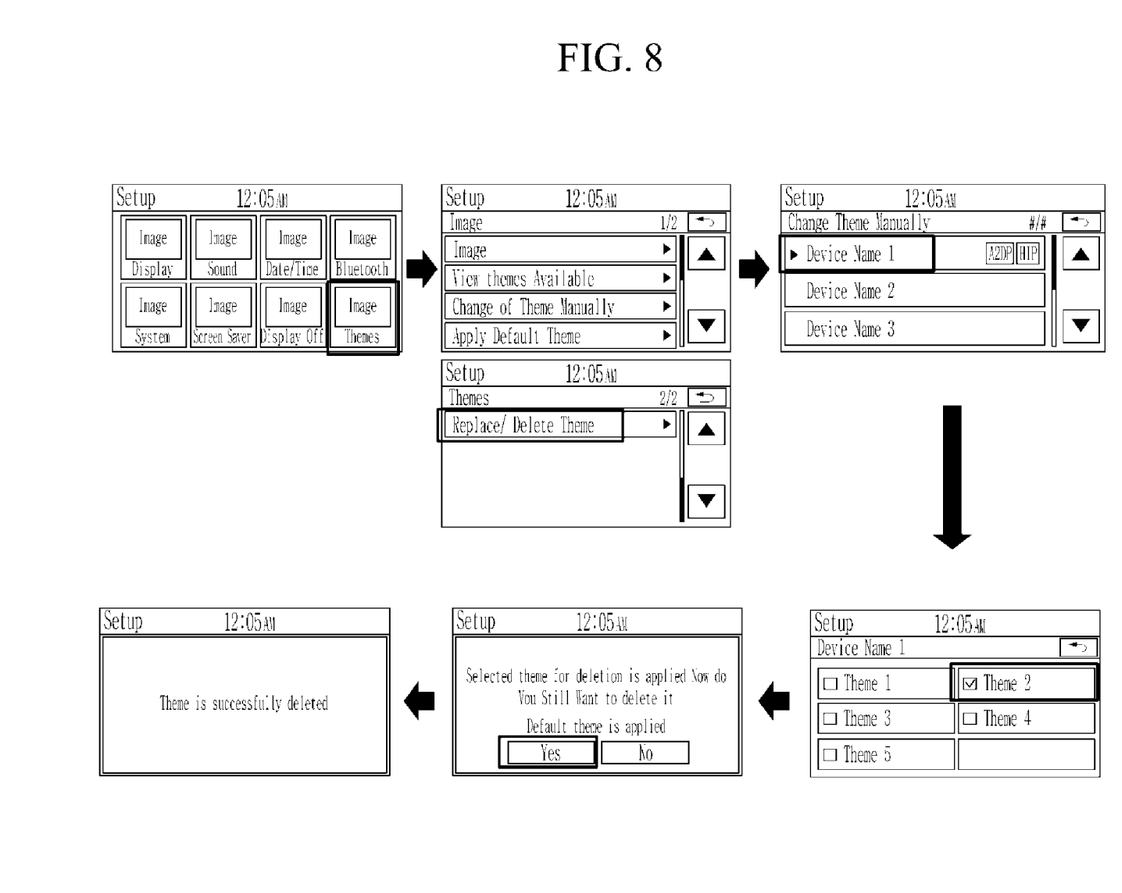
FIG. 8 is a view for explaining a method of deleting the color in the display change method shown in FIG. 5.

FIG. 5 is a flowchart illustrating a display change method included in the method for setting the display of the infotainment system shown in FIG. 2; FIG. 6 is a view for explaining a color application step shown in FIG. 5; and FIG. 7 is a view for explaining the display change method shown in FIG. 5 in more detail; and FIG. 8 is a view for explaining a method of deleting the color in the display change method shown in FIG. 5. Referring to FIG. 8, the representative color of a first user device 100 may be deleted by the user's selection.

Referring to FIGS. 5 to 8, in step 300, the first user device 100 may be reconnected to the vehicle infotainment system 105 via an established wireless communication session.

According to step 305, when the first user device 100 is reconnected to the vehicle infotainment system 105 via the established wireless communication session, the controller of the vehicle infotainment system 105 may change or convert the screen of the display device from a default color of the screen of the display device to the representative color of the first user device saved in the first MAC address. "Passkey" shown in FIG. 6 may be the first MAC address.

According to step 310, the connection between the first user device 100 and the vehicle infotainment system 105 may be disconnected and a second user device, which stores a second representative color for setting the screen of the infotainment system 105 for the vehicle in a second MAC address, may be reconnected to the infotainment system 105 via wireless communication.

According to step 315, when the second user device is reconnected to the vehicle infotainment system 105 via an established wireless communication session, the controller of the infotainment system 105 for the vehicle may change or convert the screen of the display device from the representative color of the first user device 100 stored in the first MAC address to the representative color of the second user device stored in the second MAC address. In more detail, the controller of the vehicle infotainment system 105 may change the screen of the display device to the representative color of the second user device that is stored in the second MAC address and is used for setting the screen of the infotainment system for the vehicle. "Passkey" shown in FIG. 6 may be the second MAC address.

According to step 320, when communication between the user device 100 including the second user device and the infotainment system 105 for the vehicle is disconnected, the controller of the infotainment system for the vehicle may change the screen of the display device from the representative color of the second user device stored in the second MAC address to the default color of the screen of the display device.

Figure 9:
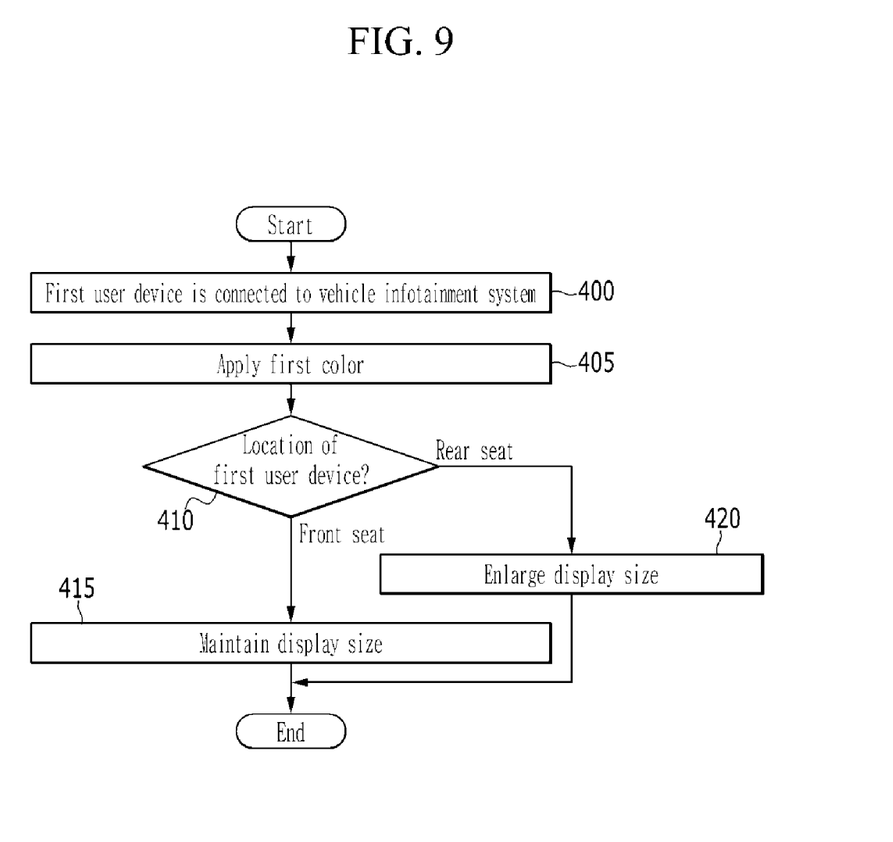
FIG. 9 is a flowchart explaining a display size change method in the method for setting the display of the infotainment system shown in FIG. 2.
Figure 10:
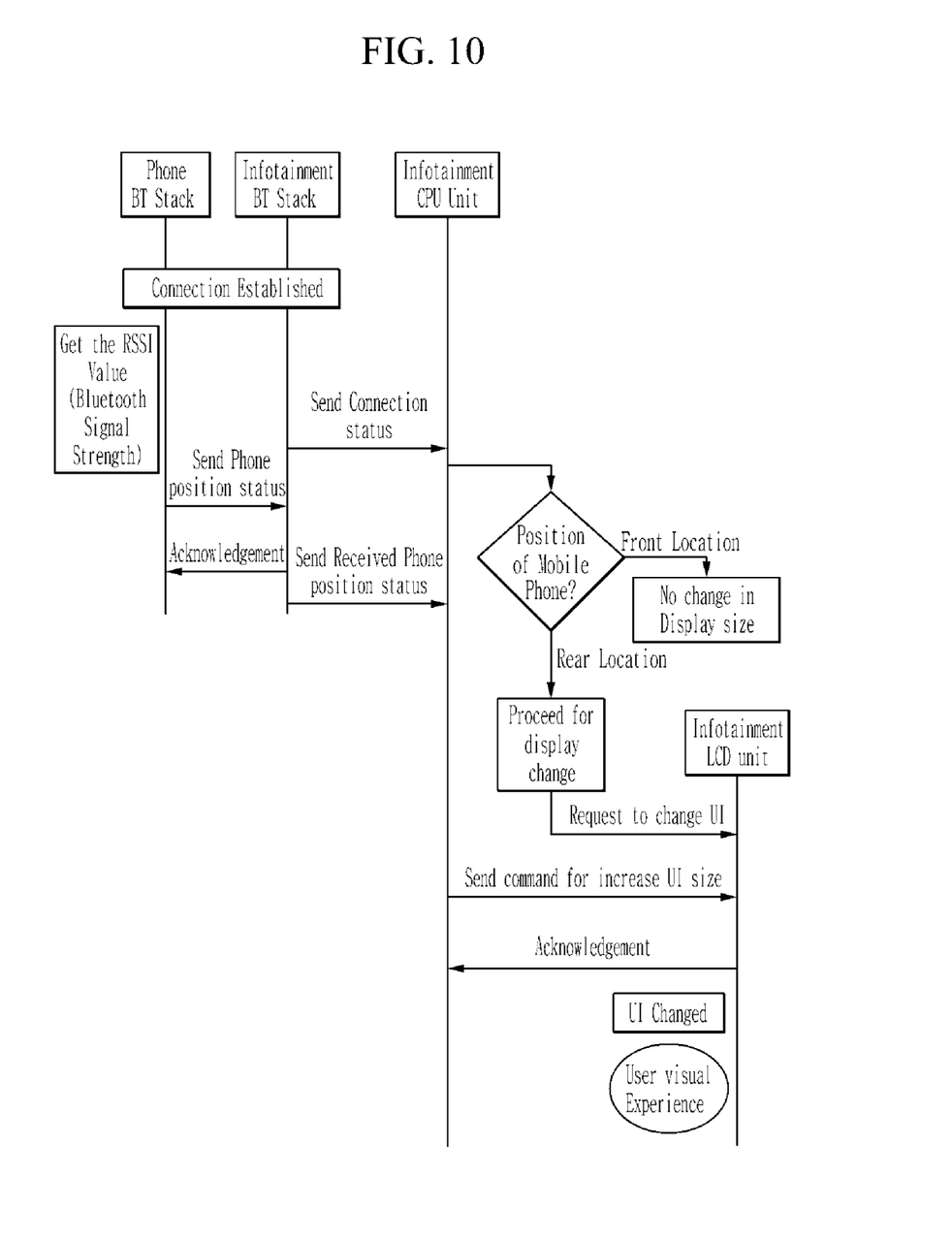
FIG. 10 is a view for explaining the display size change method shown in FIG. 9 in more detail.

FIG. 9 is a flowchart explaining a display size change method in the method for setting the display of the infotainment system shown in FIG. 2; and FIG. 10 is a view for explaining the display size change method shown in FIG. 9 in more detail.

Referring to FIGS. 9 and 10, in step 400, the first user device 100 may be reconnected to the vehicle infotainment system 105 via an established wireless communication session.

According to step 405, when the first user device 100 is reconnected to the vehicle infotainment system 105 via the established wireless communication session, the controller of the vehicle infotainment system 105 may change the screen of the display device from the default color of the screen of the display device to the representative color of the first user device stored in the first MAC address.

According to step 410, in order to identify or check a location of the first user device 100 (i.e., a location of the user in the vehicle), the controller of the infotainment system 105 for the vehicle may determine whether a received signal strength indication (RSSI) value related to a wireless communication signal of the infotainment system, which is received from the first user device, exceeds a reference value (e.g., −40 dB).

According to step 415, the controller of the vehicle infotainment system 105 may control the display device to maintain the screen size or a display resolution of the display device when the RSSI value is less than or equal to the reference value. When the RSSI value is less than or equal to the reference value, the first user device 100 may be located at a front seat of the vehicle.

According to step 420, the controller of the infotainment system 105 for the vehicle may control the display device to enlarge or zoom the screen size of the display device when the RSSI value exceeds the reference value. When the RSSI value exceeds the reference value, the first user device 100 may be located at a rear seat of the vehicle. When the screen size of the display device is zoomed, a size of a text or a video content (e.g., an icon) displayed on the screen of the display device may be increased.

Figure 11:
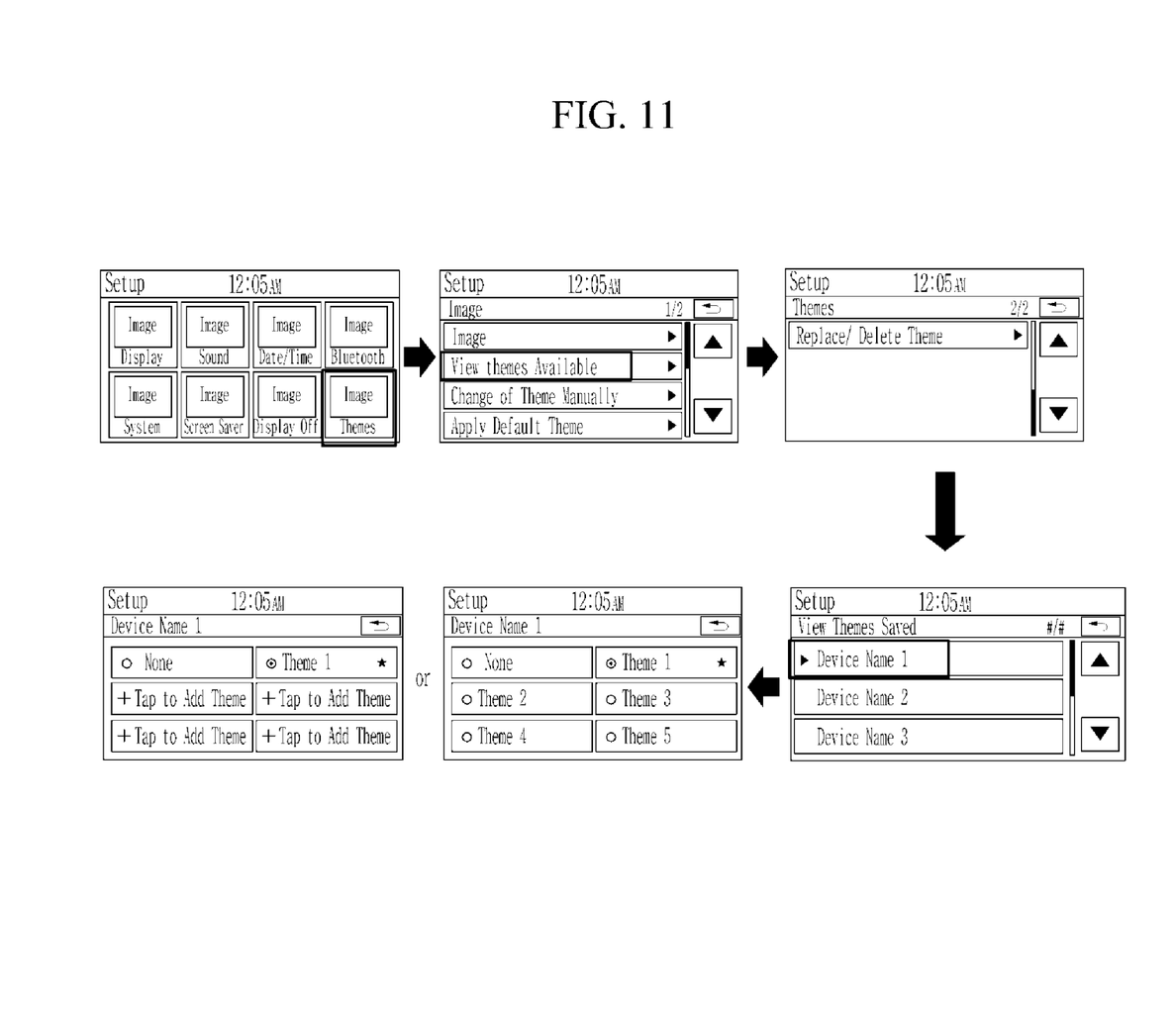
FIG. 11 is a view for explaining a method of viewing multiple representative colors (or color themes) stored using a single user device in the method for setting the display of the infotainment system shown in FIG. 2.

FIG. 11 is a view for explaining a method of viewing multiple representative colors (or color themes) stored using a single user device in the method for setting the display of the infotainment system shown in FIG. 2.

As shown in FIG. 11, a setup screen displayed by the controller of the infotainment system 105 for the vehicle may show representative colors of the first user device 100 stored in a memory of the infotainment system of the vehicle.

Figure 12:
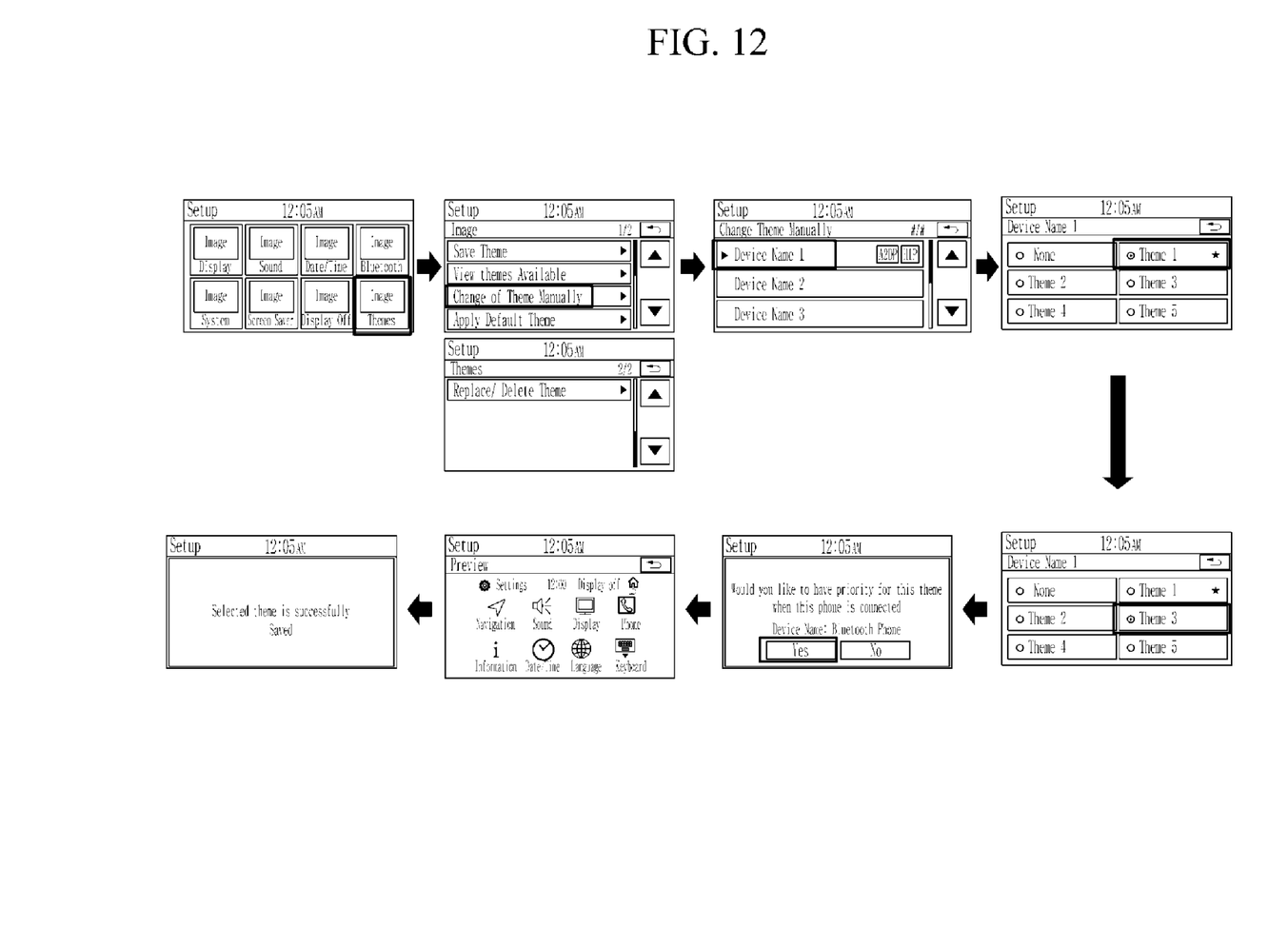
FIG. 12 is a view for explaining a method of selecting any one of multiple representative colors stored using a single user device in the method for setting the display of the infotainment system shown in FIG. 2.

FIG. 12 is a view for explaining a method of selecting any one of multiple representative colors stored using a single user device in the method for setting the display of the infotainment system shown in FIG. 2.

As shown in FIG. 12, a setup screen displayed by the controller of the infotainment system 105 for the vehicle may show a method for selecting one of the representative colors of the first user device 100 stored in the memory of the infotainment system for the vehicle. One of the representative colors of the first user device 100 may be selected by the user.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be by those skilled in the art that various modifications and equivalent exemplary embodiments are possible from the present disclosure. Accordingly, the actual technical protection scope of the present disclosure must be determined by the spirit of the appended claims.

DESCRIPTION OF SYMBOLS

100: user device
105: vehicle infotainment system

What is claimed is:

1. A method for controlling a display of a vehicle infotainment system, the method comprising:
   establishing, by a controller of the vehicle infotainment system, a wireless communication session with a first user device;
   receiving, by the controller, an indication of a representative color from the first user device via the established wireless communication session; and
   controlling, by the controller, the vehicle infotainment system such that a display screen of a display device of the vehicle infotainment system displays the representative color.

2. The method of claim 1, further comprising:
   storing, by the controller, the representative color in a media access control (MAC) address of the first user device.

3. The method of claim 2, further comprising:
   controlling, by the controller, the vehicle infotainment system such that the display screen displays the representative color stored in the MAC address when the first user device reconnects to the vehicle infotainment system via wireless communication.

4. The method of claim 3, further comprising:
   controlling, by the controller, the vehicle infotainment system such that the display screen displays a representative color of a second user device that is stored in a second MAC address when the second user device reconnects to the vehicle infotainment system via wireless communication.

5. The method of claim 1, further comprising:
   before the display screen displays the representative color, controlling, by the controller, vehicle infotainment system such that the display screen displays a preview screen of the vehicle infotainment system to a user, wherein the preview screen shows the representative color as being applied to the vehicle infotainment system.

6. The method of claim 3, further comprising:
   receiving, by the controller, a wireless communication signal from the first user device via the established wireless communication session;
   determining, by the controller, whether a received signal strength indication (RSSI) value of the wireless communication signal received from the first user device exceeds a reference value; and
   enlarging, by the controller, a display screen size of the display device when the RSSI value exceeds the reference value.

7. The method of claim 6, further comprising:
   maintaining, by the controller, the display screen size of the display device when the RSSI value is less than or equal to the reference value.

8. The method of claim 1, further comprising:
   capturing, by a camera of the first user device, an image of interest;
   extracting, by a controller of the first user device, a color from the captured image; and
   transmitting, by the controller of the first user device, the extracted color to the vehicle infotainment system via the established wireless communication session,
   wherein the extracted color corresponds to the representative color.

9. The method of claim 8, wherein the extracting of the color comprises:
   converting, by the controller of the first user device, the captured image to a three-dimensional RGB format having a sampling rate; dividing, by the controller of the first user device, the converted three-dimensional RGB format using grids to calculate an average value of pixel values in the grids; and
   determining, by the controller of the first user device, a color from a color palette that corresponds to the average value as the extracted color from the captured image.

10. A vehicle infotainment system comprising:
    a display device; and
    a controller configured to establish a wireless communication session with a first user device, to receive an indication of a representative color from the first user device via the established wireless communication session, and to control the vehicle infotainment system such that a display screen of a display device of the vehicle infotainment system displays the representative color.

11. The vehicle infotainment system of claim 10, wherein the controller is further configured to store the representative color in a media access control (MAC) address of the first user device.

12. The vehicle infotainment system of claim 11, wherein the controller is further configured to control the vehicle infotainment system such that the display screen displays the representative color stored in the MAC address when the first user device reconnects to the vehicle infotainment system via wireless communication.

13. The vehicle infotainment system of claim 12, wherein the controller is further configured to control the vehicle infotainment system such that the display screen displays a representative color of a second user device that is stored in a second MAC address when the second user device reconnects to the vehicle infotainment system via wireless communication.

14. The vehicle infotainment system of claim 10, wherein, before the display screen displays the representative color, the controller is further configured to control the vehicle infotainment system such that the display screen displays a preview screen of the vehicle infotainment system to a user, wherein the preview screen shows the representative color as being applied to the vehicle infotainment system.

15. The vehicle infotainment system of claim 12, wherein the controller is further configured to receive a wireless communication signal from the first user device via the established wireless communication session, to determine whether a received signal strength indication (RSSI) value of the wireless communication signal received from the first user device exceeds a reference value, and to enlarge a display screen size of the display device when the RSSI value exceeds the reference value.

16. The vehicle infotainment system of claim 15, wherein the controller is further configured to maintain the display screen size of the display device when the RSSI value is less than or equal to the reference value.

17. The vehicle infotainment system of claim 15, wherein the representative color is extracted from an image of interest captured by a camera of the first user device.

\* \* \* \* \*